United States Patent Office.

MOORE R. FLETCHER, OF CAMBRIDGEPORT, MASSACHUSETTS.

*Letters Patent No. 74,332, dated February 11, 1868; antedated February 5, 1868.*

IMPROVEMENT IN SEPARATING FIBRES FROM WOOD AND OTHER SUBSTANCES.

The Schedule referred to in these Letters Patent and making part of the same.

Be it known that I, MOORE R. FLETCHER, of Cambridgeport, in the county of Middlesex, and State of Massachusetts, have invented a new and useful Improvement in the Process of Preparing the Fibres of Wood, or of any Fibrous Vegetable Matter, for the manufacture of paper or any textile material, rope, twine, &c., of which the following is a full, clear, and exact description.

My invention consists in separating the fibres of wood, and of any kind of vegetable production, by a cheap, simple, and expeditious process, so that the said fibre may be successfully used in the manufacture of the various grades of paper, and also of matting, felting, cloth, or other articles which may be composed of textile or fibrous material. The process heretofore used for separating the fibres of vegetable material, in preparing it for the manufacture of paper, &c., is to subject the said fibres to the action of a very caustic alkaline solution, under a high degree of heat and steam pressure. In this process, it is requisite that the boilers should be of great strength, and consequently very expensive and difficult to properly construct, so as to resist the great pressure required, as they are necessarily of large capacity. Another method of treating fibrous vegetable matter, for preparing it for the manufacture of paper, &c., is to subject the same to a very strong solution of lime and water, say, two or three barrels of lime to one ton of the fibrous material, in a sufficient quantity of water to cover it; the whole being placed in a large tank, which is securely covered, when steam is admitted to the bottom of the tank, or it may be heated by a fire in the ordinary manner. The steam or heat is kept at the highest attainable point for the space of from sixteen to forty-eight hours, according to the quality of the vegetable matter under treatment, and the quality of paper to be made from the same. Attempts have also been made to prepare fibrous vegetable material, for the manufacture of paper, &c., by subjecting it to the action of acids of various kinds, such as sulphuric and muriatic, and to the vapor of several acids, also to the combined action of acids and vapors and gases; but such processes have proved to be very expensive, and otherwise objectionable.

After many years of experiment, I have found that a high degree of heat suddenly applied, and continued, in connection with a solution of alkali or lime, to fibrous vegetable matter, has the effect of hardening instead of softening the albuminous, resinous, or nitrogenous matter, known as the proximate principle, in a manner similar to that produced upon the albumen of an egg in boiling. It is well known that the albumen of an egg may be readily dissolved in cold or warm water; but, when subjected to a high degree of heat, it becomes almost insoluble. I have also found that the addition of lime or alkali to the albumen of an egg speedily forms a cement, which is insoluble in water, alcohol, or oil, and effectually resists a high degree of wet or dry heat.

By subjecting fibrous vegetable matter to the action of a very strong solution of caustic alkali, or lime and water, and continuing the same until their texture is broken, the strength of the fibre becomes very much weakened, and is often destroyed by the action of the chemical substances, which are not easily removed by washing, the result of which is a yellow color being imparted to the material, and eventually the destruction or decay of the fibre.

By the above treatment, also, the material becomes tinctured with a coloring-matter, which is very difficult, and, in some instances, almost impossible, to bleach out without injuring the strength and destroying the value of the fibre, and if the process of softening in an iron kettle, tank, or rotary bleacher, or in a wooden tank, in which iron in any way comes in contact with the solution, a tinge of iron is imparted to the fibre, which is very difficult to remove.

After numerous and long-continued experiments, I have discovered that a comparatively very weak solution of alkali, or lime and water, and a very low degree of heat, will have the effect of softening, separating, and removing the albuminous, resinous, or nitrogenous matter, known as the "proximate principle," and will thoroughly prepare the wood, or other vegetable fibrous substance for the manufacture of paper, or of a fibre which may be used for spinning, felting, matting, or other fibrous and textile material, at a very small cost, and in a short space of time, and without injuring the strength of the fibre thus treated, and that after having softened the albuminous, resinous, or nitrogenous matter by weak solutions of alkali, or lime and water, and a low degree of heat, it may be advantageously removed by a higher degree of heat than was practicable in the process of softening, and, if found convenient, for hastening the process, the material, after having been treated as above, may be subjected to heat and to a steam pressure from the boiling-point up to two hundred pounds to the square inch.

Having stated the nature of my invention, and some of its advantages, I will now proceed to describe the manner in which I have carried it out.

For making pulp for brown paper, or fibre for spinning, felting, matting, or other fibrous or textile fabrics not requiring bleaching, I take, of good unslaked lime, ten pounds, and slake it thoroughly, making a milk of lime, which is then mixed in about eight thousand gallons of water, or as much as will cover one ton of the vegetable matter contained in a wooden tank. Heat is then applied to the tank, and its contents, by steam, passed through pipes, or by means of a fire, in the ordinary manner, until the temperature of the said solution reaches to about 135° Fahrenheit. The heat is then checked, and the temperature of the solution is kept at the above degree of heat for from ten minutes to one hour, or more, according to the quality and condition of the material under treatment. The heat of the solution is then raised to 195° Fahrenheit, or even to the boiling-point, and kept at that temperature until the fibrous matter in the tank is sufficiently treated, which may readily be determined by any skillful person upon testing a small sample in the manner well known to expert paper-makers. The degree of temperature above named is not indispensable, for, where time is not important, excellent results may be obtained from a temperature of 65° to 70° Fahrenheit; but the time required increases as the temperature is diminished. The solution is then drawn off, and the fibrous vegetable matter in the tank is washed either with cold or warm water, but preferably in water at a temperature of about 125° Fahrenheit, or the fibrous vegetable matter may be removed from the tank and rubbed, pounded, or crushed between rollers, or otherwise manipulated, to separate the fibre, and then washed in a pulping-engine, or by other suitable means. Such of the fibrous vegetable matter as is intended for pulp for making brown paper may be put into a pulping-engine and beaten carefully to preserve the length of the fibre, and subsequently made into paper in the ordinary manner. If the fibrous vegetable matter is to be made into white pulp, for making paper, or other fibrous or textile fabrics, soda-ash, or some of the salts of soda, may be used instead of lime in the same proportions, and subjected to the same treatment as above described.

I have found that a bleach may be cheaply obtained by the use of two parts of soda-ash and one part of chloride of lime, some of the fibrous vegetable substances, such as wood, straw, and some of the grasses, being required to stand in the bleaching-solution from four to sixteen hours; and to obtain a pure white, and retain the strength of fibre, it can be done by several solutions with alternate drainings.

As different kinds of fibrous vegetable matter require a stronger or weaker solution, the above-named proportions may be varied to suit the circumstances of the case, and a longer or shorter period of time may also be required for softening and separating the albuminous, resinous, or nitrogenous matter.

The treatment above stated applies also to the bleaching of vegetable substances. Other alkalies may also be used in the place of lime and soda-ash, as also the carbonates and bicarbonates, salts of soda, and of potash, and other alkaline salts, either alone or in combination, of the same alkaline strength; but, for general use, I prefer lime for brown fibre not to be subjected to bleaching, and soda-ash for the white pulp or fibre to be bleached, on account of their small comparative cost.

By the process above described, it will be seen that my invention differs from the processes heretofore known and employed in the separation of the fibres of vegetable material, and preparing the same for the manufacture of paper, &c., in that I use a very weak alkaline solution, at a comparatively very low degree of heat, by which I effect better results in the quantity and quality of the manufactured article, and at a reduction in cost of several hundred per cent.

What I claim, therefore, as my invention, and desire to secure by Letters Patent, is—

1. The process above described for preparing the fibre of wood, or that of any vegetable fibrous substance, for the manufacture of paper, or any textile material, substantially as specified.

2. I claim subjecting the fibres of wood, or other fibrous vegetable substances, to the action of a very weak solution of alkali, or lime and water, as specified.

3. I claim subjecting the fibres of wood, or other fibrous vegetable matter, when mixed with a weak solution of alkali, or lime and water, to a degree of heat not above the boiling-point, or below 33° Fahrenheit, as specified.

4. I claim subjecting the fibres of wood, or other vegetable fibrous substances, after the same have been subjected to the action of a weak solution of alkali, or lime and water, at a low temperature, until the albuminous, resinous, or nitrogenous matter has been softened, to the action of a high degree of heat and steam-pressure, as and for the purpose specified.

5. I claim bleaching vegetable fibrous substances, by subjecting the same to the action of a solution of soda-ash and chloride of lime, in the manner substantially as above described.

In testimony whereof, I have signed my name to this specification in the presence of two subscribing witnesses.

MOORE R. FLETCHER.

Witnesses:
   Jos. H. Adams,
   David Kelleher.